United States Patent
Ogawa et al.

(10) Patent No.: US 10,594,240 B2
(45) Date of Patent: Mar. 17, 2020

(54) CONTROL DEVICE FOR ALTERNATING CURRENT MOTOR

(71) Applicant: DENSO CORPORATION, Kariya, Aichi-pref. (JP)

(72) Inventors: Takashi Ogawa, Kariya (JP); Masaki Nishiyama, Kariya (JP); Mitsuharu Matsuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/254,281

(22) Filed: Jan. 22, 2019

(65) Prior Publication Data

US 2019/0229661 A1    Jul. 25, 2019

(30) Foreign Application Priority Data

Jan. 23, 2018 (JP) ................................ 2018-008954

(51) Int. Cl.
*H02P 21/00* (2016.01)
*H02P 21/10* (2016.01)

(52) U.S. Cl.
CPC .................................. *H02P 21/10* (2013.01)

(58) Field of Classification Search
CPC ......... H02P 21/10; H02P 21/141; H02P 21/24
USPC ............................................ 318/400.02, 490
See application file for complete search history.

(56) References Cited

U.S. PATENT DOCUMENTS

| 5,650,706 | A | 7/1997 | Yamada et al. | |
|---|---|---|---|---|
| 9,059,653 | B2 * | 6/2015 | Shimada | .................. H02P 6/183 |
| 2006/0119312 | A1 | 6/2006 | Okamura et al. | |
| 2014/0176028 | A1 * | 6/2014 | Tobari | ..................... B60L 58/12 |
| | | | | 318/400.02 |
| 2014/0312812 | A1 * | 10/2014 | Sasaki | ................. H02P 21/0003 |
| | | | | 318/400.02 |
| 2015/0137720 | A1 * | 5/2015 | Kobayashi | ............. H02P 21/141 |
| | | | | 318/400.15 |
| 2015/0357956 | A1 * | 12/2015 | Shimada | ................. H02P 6/181 |
| | | | | 318/400.02 |
| 2015/0372627 | A1 * | 12/2015 | Kim | ...................... H02P 21/141 |
| | | | | 318/801 |
| 2017/0155349 | A1 * | 6/2017 | Kim | ......................... H02P 6/28 |

* cited by examiner

*Primary Examiner* — Eduardo Colon Santana
*Assistant Examiner* — Gabriel Agared
(74) *Attorney, Agent, or Firm* — Oliff PLC

(57) ABSTRACT

In a MG control device, a standard voltage calculation part calculates a d axis standard voltage and a q axis standard voltage in a standard state in which no demagnetization occurs in permanent magnets of a MG. A magnetic flux change amount estimation value calculation part calculates a basic magnetic flux change amount estimation value based on a deviation of a specific value from the q-axis standard voltage. This specific value is obtained by multiplying q axis real voltage with a ratio of the d axis standard voltage and the d axis real voltage. A magnetic flux change amount estimation value correction part adjusts a magnetic flux change amount estimation value by correcting the basic magnetic flux change amount estimation value relatively to a detection threshold value based on characteristic change of the MG in a demagnetization state of the permanent magnets of the MG.

6 Claims, 8 Drawing Sheets

CONTROL DEVICE FOR ALTERNATING CURRENT MOTOR

CROSS-REFERENCE TO RELATED APPLICATION

This application is related to and claims priority from Japanese Patent Application No. 2018-8954 filed on Jan. 23, 2018, the contents of which are hereby incorporated by reference.

TECHNICAL FIELD

The present disclosure relates to control devices performing power supply control to supply alternating current power to alternating current motors.

BACKGROUND

There are known control devices for alternating current motors (AC motors) configured to detect occurrence of demagnetization in a permanent magnet type motor by detecting reduction of an output torque thereof caused by irreversible demagnetization within a high temperature range. It is difficult for these control devices to correctly detect the occurrence of demagnetization in a permanent magnet type motor with high accuracy.

SUMMARY

The present disclosure provides the following devices. A control device for alternating current motors as an aspect of the present disclosure performing a power supply control of an alternating current motor having permanent magnets.

The control device has a magnetic flux change amount estimation part comprising a magnetic flux change amount estimation value calculation part which calculates a basic magnetic flux change amount estimation value, and a magnetic flux change amount estimation value correction part which calculates a magnetic flux change amount estimation value by correcting the basic magnetic flux change amount estimation value based on characteristic change of the alternating current motor in a demagnetization state of the permanent magnets of the alternating current motor.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
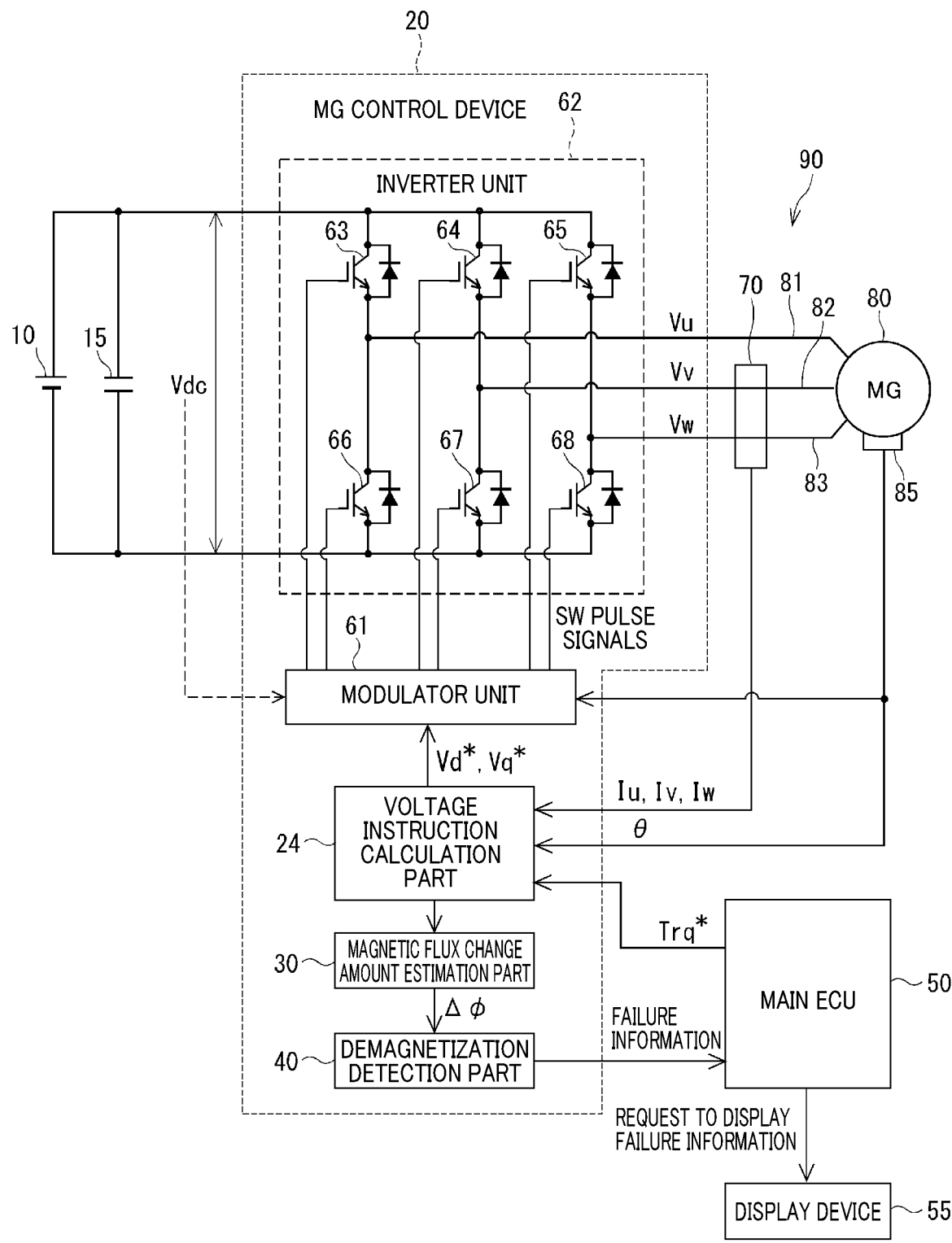
FIG. 1 is a view showing an overall structure of a motor generator drive system equipped with a motor generator control device according to exemplary embodiments of the present disclosure.

Hereinafter, various embodiments of the present disclosure will be described with reference to the accompanying drawings. In the following description of the various embodiments, like reference characters or numerals designate like or equivalent component parts throughout the several diagrams.

A description will be given of a control device for alternating current motors (AC motors) as a motor generator control device 20 (MG control device 20) according to first and second exemplary embodiments of the present disclosure with reference to drawings.

FIG. 1 is a view showing an overall structure of a motor generator drive system 90 (MG drive system 90) equipped with the MG control device 20 as the control device for AC motors according to the first and second exemplary embodiments. As shown in FIG. 1, the MG drive system 90 is equipped with the MG control device 20 as the control device for AC motors.

The MG control device 20 is configured to perform power supply control to supply alternating current power (AC power) to alternating current motors (AC motors). The MG drive system 90 drives the motor generator (MG) 80 mounted on a motor vehicle such as hybrid vehicles and may act as an electric motor. The MG 80 is a permanent magnet type MG. The MG 80 is used as a main driving power source of the motor vehicle. The MG control device 20 performs an electric power supply to supply electric power to the MG 80.

First Exemplary Embodiment

A description will be given of an overall structure of the MG drive system 90 with reference to FIG. 1. FIG. 1 shows a schematic structure of the MG drive system 90 equipped with the MG control device 20.

As shown in FIG. 1, the MG control device 20 has a voltage instruction calculation part 24, a magnetic flux change amount estimation part 30, a demagnetization detection part 40, a modulator unit 61, an inverter unit 62 as an electric power conversion unit, etc.

The MG 80 is a permanent magnet synchronous three phase AC motor. For example, the MG 80 corresponds to an interior permanent magnet synchronous motor (IPMSM) and a surface permanent magnet synchronous motor (SPMSM). In the exemplary embodiment, the MG 80 has a first function and a second function. The first function of the MG 80 provides an electric motor capable of generating an output torque to be used for driving wheels of a hybrid vehicle. The second function of the MG 80 provides an alternator to be driven by a torque transmitted from an internal combustion engine and the wheels of the hybrid vehicle. The alternator generates an electric power using the received torque transmitted from the internal combustion engine and the wheels.

The current sensor 70 detects two or three of phase currents Iu, Iv, Iw which flow in two phase windings or three phase windings 81, 82 and 83 of the MG 80. When the current sensor 70 detects two phase currents, the remaining phase current is calculated on the basis of the Kirchhoff's circuit laws. A rotation angle sensor 85 is a resolver capable of detecting an electrical angle θ of the MG 80.

The inverter 62 acts as an electric power converter comprising upper arm and a lower arm. In the inverter 62, the upper arm has three switching elements 63, 64 and 65, and the lower arm has three switching elements 66, 67 and 68. The switching elements switching elements 63 to 68 are connected together in a bridge form. In more detail, the switching elements 63, 64 and 65 correspond to the respective the U phase upper arm, the V phase upper arm and the W phase upper arm. The switching elements 66, 67 and 68 correspond to the respective the U phase lower arm, the V phase lower arm and the W phase lower arm. For example, the switching elements 63, 64 and 65 are composed of Insulated Bipolar Transistors (IGBTs). A flyback diode (or a freewheeling diode) is connected in parallel to each of the switching elements 63, 64 and 65. It is acceptable to use the IGBTs and the respective flyback diodes in a power-card configuration.

A smoothing capacitor 15 is arranged at an input side of the inverter 62, and smooths a direct current voltage Vdc (DC voltage Vdc) supplied from a battery 10. It is acceptable to arrange a booster converter between the battery 10 and the inverter 62. The inverter 62 receives switching pulse signals (SW pulse signals shown in FIG. 1) transmitted from the MG control device 20. The switching elements 63 to 66 in the inverter 62 are turned on/odd on the basis of the received SW pulse signals so as to convert a direct current power (DC power) to a three phase alternating current power (three phase AC power). The inverter 62 supplies three phase voltages Vu, Vv, Vw of the converted three phase AC power to the respective three phase windings 81, 82 and 83 of the MG 80.

In general, a computer system is composed of a microcomputer composed of a central processing unit (CPU), a read only memory (ROM), a random access memory (RAM), an input/output port (I/O port), bus lines, etc. The CPU, the ROM, the RAM, the I/O port are connected together through the bus lines. The microcomputer provides functioning of the voltage instruction calculation part 24, the modulator unit 61, etc. in the MG control device 20. In the microcomputer, the CPU executes programs which have been stored in a memory device (i.e. a non-transitory computer readable storage medium for storing programs), for example, the ROM so as to provide the functioning of the modulator unit 61, the MG control device 20, etc. It is acceptable to use hardware units composed of dedicated electronic circuits so as to provide the functioning of the modulator unit 61, the MG control device 20, etc.

The voltage instruction calculation part 24 calculates voltage instruction values Vd*, Vq* on the basis of a torque instruction Trq* transmitted from a main electronic control unit 50 (main ECU 50), three phase currents Iu, Iv, Iw which are provided by feedback from the current sensor 70 and the rotation angle sensor 85 and information about the electrical angle θ of the MG 80. The voltage instruction calculation part 24 supplies the calculated voltage instruction values Vd*, Vq* to the MG 80.

The modulator unit 61 generates a switching pulse signal on the basis of the DC voltage Vdc, the voltage instruction values Vd*, Vq*, the electrical angle θ, etc. The modulator unit 61 transmits the generated switching pulse signal to the switching elements 63 to 68 in the inverter 62.

The magnetic flux change amount estimation part 30 calculates an estimation value of a magnetic flux change amount (hereinafter, referred to as the magnetic flux change amount estimation value ΔΦ) of the permanent magnets of the MG 80 in the magnetic flux change amount estimation part 30. A detailed structure and functioning of the magnetic flux change amount estimation part 30 will be explained later.

The demagnetization detection part 40 determines that the permanent magnets in the MG 80 are demagnetized when the magnetic flux change amount estimation value ΔΦ calculated by the magnetic flux change amount estimation part 30 is lower than a predetermined detection threshold value.

When detecting the occurrence of demagnetization of the permanent magnets in the MG 80, the demagnetization detection part 40 generates and transmits failure information of the main ECU 50 in the motor vehicle. The main ECU 50 which has received the failure information transmitted from the demagnetization detection part 40 instructs a meter electric control unit (meter ECU) so as for a display device 55 mounted on the motor vehicle so as to display the failure information. Input parameters to be transmitted to the magnetic flux change amount estimation part 30 and the demagnetization detection part 40 are omitted from FIG. 1.

A description will be given of the structure of the MG control device 20 with reference to FIG. 2.

Figure 2:
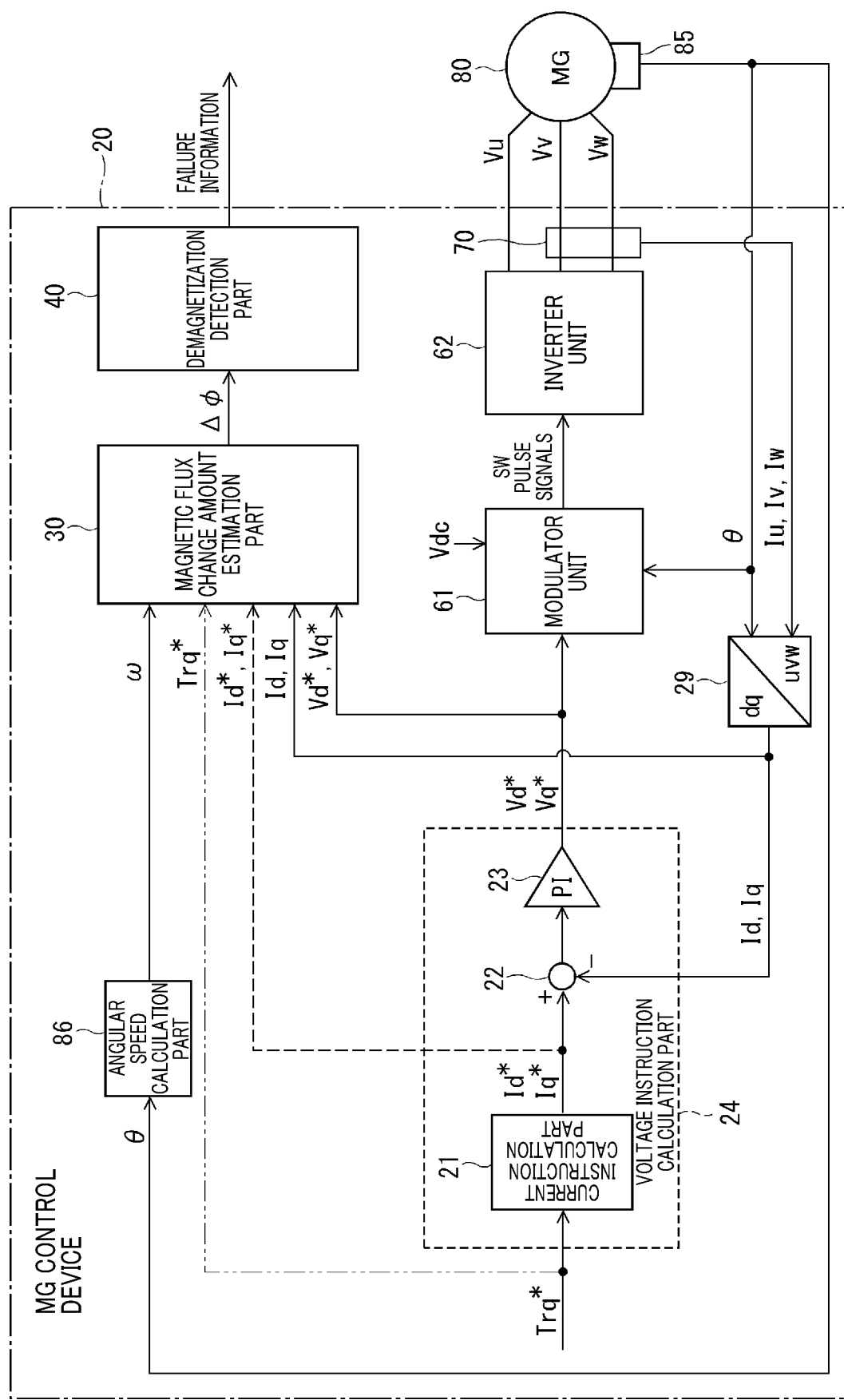
FIG. 2 is a block diagram showing a detailed structure of the MG control device according to the exemplary embodiments of the present disclosure shown in FIG. 1.

FIG. 2 is a block diagram showing a detailed structure of the MG control device 20 according to the exemplary embodiment of the present disclosure shown in FIG. 1. FIG. 2 shows an example of the structure configured to calculate the voltage instruction values on the basis of the current feedback control. It is acceptable to calculate the voltage instruction values on the basis of a torque feedback control.

The MG control device 20 has the magnetic flux change amount estimation part 30 as a specific component of the MG control device according to the exemplary embodiment. The vector control using d-q coordinates of a rotary coordinate system is a known technique. The voltage and current to be used in the control calculation performed by the MG control device 20 correspond to a d-q axis voltage and a d-q axis current.

The voltage instruction calculation part 24 has a current instruction calculation part 21, a current deviation calculation part 22 and a control unit 23. The current instruction calculation part 21 calculates the current instruction values Id*, Iq* on the basis of the torque instruction Trq*.

The current deviation calculation part 22 calculates a current deviation of the d and q axis current detection values Id and Iq from the current instruction values Id*, Iq*, where the current detection values Id, Iq have been provided by feedback from a d-q conversion part 29.

The control unit 23 performs a proportional integral (IP) control so as to calculate voltage instruction values Vd*, Vq* so that the current deviation calculated by the current deviation calculation part 22 approaches to zero.

The d-q conversion part 29 converts the three phase current values Iu, Iv, Iw to a d axis current value Id and a q axis current value Iq on the basis of the electrical angle θ. The d-q conversion part 29 transmits the obtained d and q axis current values Id and Iq to the current deviation calculation part 22. That is, the d-q conversion part 29 performs the feedback of the obtained d and q axis current values Id and Iq to the current deviation calculation part 22.

The modulator unit 61 generates the switching pulse signals on the basis of the DC voltage Vdc, the voltage instruction values Vd*, Vq* and the electrical angle θ, etc. The inverter unit 62 transmits the generated switching pulse signals to the inverter unit The modulator unit 61 switches the three phase modulation or the two phase modulation of the PWM control, a pulse pattern method, and a rectangle wave control method, etc. on the basis of the modulation rate and the rotation speed torque characteristics of the MG 80.

The switching elements 63 to 68 in the inverter unit 62 are turned on/off on the basis of the received switching pulse signals transmitted from the modulator unit 61 so as to convert the DC power of the battery 10 to the AC power, and supply the converted AC power to the MG 80.

A standard magnetic flux amount is determined in a standard state in which no demagnetization occurs, i.e. the permanent magnets of the MG 80 are not demagnetized. The magnetic flux change amount estimation part 30 calculates a magnetic flux change amount estimation value ΔΦ which is a deviation of a real magnetic flux amount from the standard magnetic flux amount.

Because the real magnetic flux amount becomes smaller than the standard magnetic flux amount when the permanent magnets in the MG 80 are demagnetized, the magnetic flux change amount estimation value ΔΦ becomes a negative value.

The demagnetization detection part 40 determines that demagnetization of the permanent magnets has occurred when the magnetic flux change amount estimation value ΔΦ calculated by the magnetic flux change amount estimation part 30 becomes smaller than the predetermined detection threshold value ΔΦ_diag.

As shown in FIG. 2, the magnetic flux change amount estimation part 30 receives various parameters. As shown with the solid lines in FIG. 2, the magnetic flux change amount estimation part 30 receives the voltage instruction values Vd*, Vq*, the d and q axis current values Id and Iq and an electrical angular speed ω. An angular speed calculation part 86 performs a differential calculation of the electric angle θ to obtain the electrical angular speed ω.

It is acceptable for the magnetic flux change amount estimation part 30 to receive the current instruction values Id*, Iq* transmitted from the current instruction calculation part 21, as designated by the dotted lines shown in FIG. 2.

Because a rotation speed [rpm] of the MG 80 is calculated by multiplying the electrical angular speed ω [rad/s] by a coefficient, the rotation speed of the MG 80 is designated with reference character co, i.e. the rotation speed [ω].

It is possible to use the electrical angular speed [ω] instead of using the rotation speed [ω].

A description will now be given of the magnetic flux change amount estimation calculation on the basis of the Vq method. The structure of the magnetic flux change amount estimation part 30 in the MG control device according to the exemplary embodiment will be explained later.

It is possible to explain the relationship between the voltage and the current to be supplied to the MG 80 by using Equation (1). Equation (1) uses a winding resistance R, d-q axis inductances Ld, Lq and a magnetic flux Φ.

$$\left.\begin{array}{l} Vd = -\omega \times Lq \times Iq + R \times Id \\ Vq = \omega \times Ld \times Id + R \times Iq + \omega \times \phi \end{array}\right\} \quad (1)$$

It is possible to replace Equation (1) with Equation (2) on the basis of the magnetic flux Φ.

$$\phi = \frac{Vq - \omega \times Ld \times Id - R \times Iq}{\omega} \quad (2)$$

When Φstd represents the standard magnetic flux amount and Φreal represents the real magnetic flux amount of the permanent magnets in the MG 80.

A standard voltage is determined when the permanent magnets of the MG 80 are in the standard state in which no magnetization has occurred in the permanent magnets, i.e. when the MG 80 generates the standard magnetic flux Φstd. The standard voltage is composed of a d axis standard voltage Vd_std and a q axis standard voltage Vq_std.

On the other hand, a real voltage is supplied to the MG 80 during the operation state thereof. The real voltage is composed of a d axis real voltage Vd_real and a q axis real voltage Vq_real.

When the q axis standard voltage Vq_std and the q axis real voltage Vq_real are used, Equation (1) is converted to Equations (3.1) and (3.2).

$$V_{q\_std} = \omega \times Ld \times Id + R \times Iq \pm \omega \times \Phi std \quad (3.1)$$

$$V_{q\_real} = \omega \times Ld \times Id + R \times Iq + \omega \times \Phi real \quad (3.2)$$

In order to compare the calculation results obtained by using the Vd-Vq method with the calculation results obtained by using the Vq method, The following explanation uses, as a first magnetic flux change amount estimation value ΔΦ1, a magnetic flux change amount estimation value obtained based on the Vd-Vq method, and uses as a second magnetic flux change amount estimation value ΔΦ2, a magnetic flux change amount estimation value obtained based on the Vq method.

The second magnetic flux change amount estimation value ΔΦ2 can be expressed by Equation (4) on the basis of Equations (3.1) and (3.2). A deviation of the q axis real voltage Vq_real from the q axis standard voltage Vq_std in Equation (4) is used as a second q axis voltage change amount ΔVq2.

$$\Delta \phi 2 = \phi real - \phi std = \frac{Vq\_real - Vq\_std}{\omega} = \frac{\Delta Vq2}{\omega} \quad (4)$$

Figure 3:
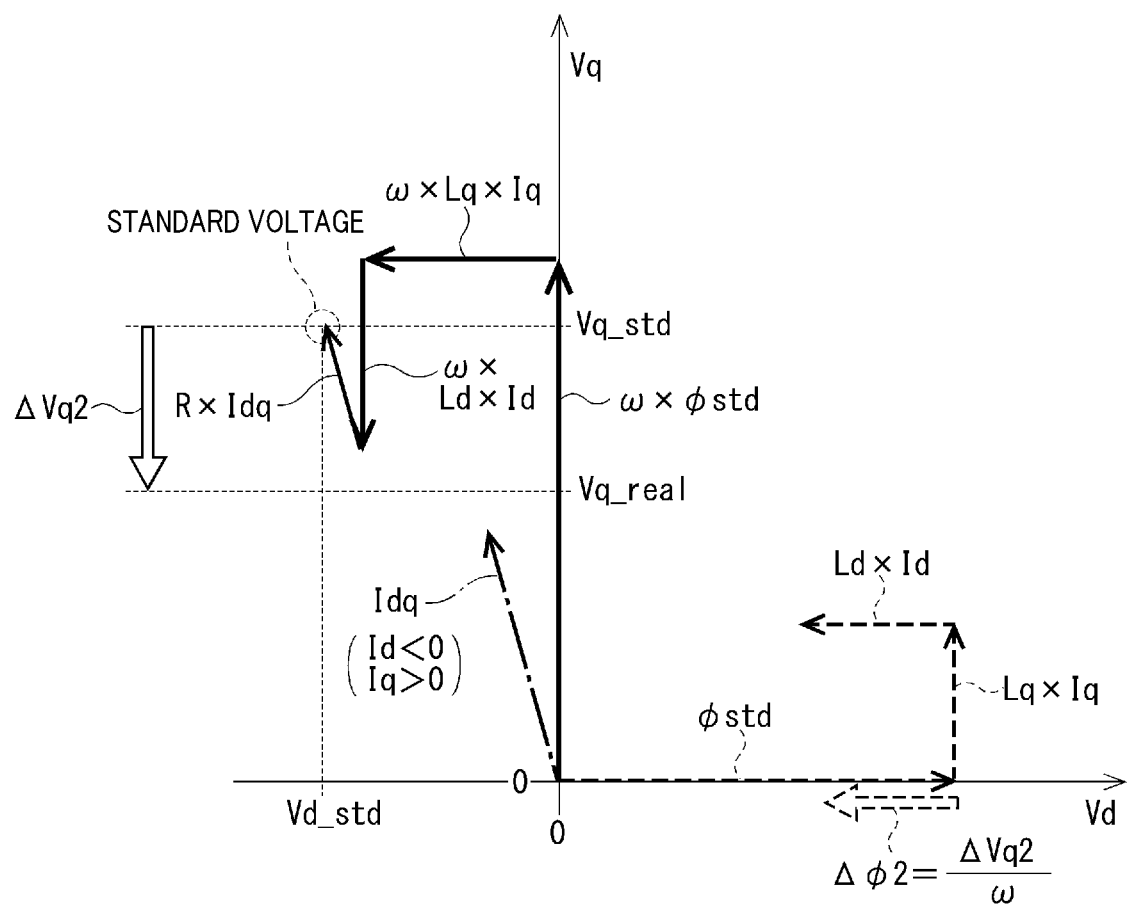
FIG. 3 is a view explaining an estimation operation of estimating a magnetic flux change amount in a motor generator.

FIG. 3 is a view explaining an estimation operation of estimating the magnetic flux change amount in the MG 80. As shown in FIG. 3, the relationship between Equation (3.1) and Equation (4) is shown in the Vd-Vq coordinate system.

In FIG. 3, the solid arrow line represents the value obtained by Equation (3.1), and the q axis component at the front of the synthesized vector corresponds to the q axis standard voltage Vq_std.

In FIG. 3, the white thick solid arrow line represents the value obtained by Equation (4). The dotted arrow line represents the vectors in the voltage and time dimension before the multiplication of the electrical angular speed ω.

The estimation of the magnetic flux change amount based on the Vq method uses the q axis voltage only, and does not use the d axis voltage. Accordingly, the estimation of the magnetic flux change amount based on the Vq method is easily influenced by detection error of the voltage sensor, etc. It is therefore difficult to correctly detect whether the q axis voltage detected by the MG control device is changed due to demagnetization of the permanent magnets of the MG 80 or due to the sensor detection error. This causes estimation accuracy of the magnetic flux change amount to reduce, and reduces the demagnetization detection reliability.

In order to avoid this drawback and to reduce the estimation error, the magnetic flux change amount estimation part 30 in the MG control device 20 according to the exemplary embodiment as the control device for AC motors according to the present disclosure performs the magnetic flux change amount estimation calculation based on the Vd-Vq method which uses the d axis voltage in addition to the a axis voltage.

Because the MG control device 20 according to the first exemplary embodiment uses the Vd-Vq method in addition to the Vq method, this makes it possible to increase the estimation accuracy when calculating the magnetic flux change amount estimation value $\Delta\Phi$. However, the first exemplary embodiment does not consider that the d axis self-inductance Ld varies when demagnetization of the permanent magnets in the MG 80 has occurred. For this reason, there is a possible incorrect detection when demagnetization of the permanent magnets has occurred on the basis of a change amount of the d axis voltage Vq only. It is acceptable to obtain the magnetic flux change amount estimation value $\Delta\Phi$ without a change of the winding resistance R of the MG 80 because a change amount of the winding resistance is small at a usual electrical angular speed $\omega$ except at a low electrical angular speed $\omega$.

In order to avoid the incorrect detection of the occurrence of demagnetization of the permanent magnets in the MG 80, the MG control device 20 according to the first exemplary embodiment uses a first correction map value and a second correction map value which will be explained later. The first correction map value is used in the standard state of the permanent magnets of the MG 80. The second correction map value is used in a transition state of the MG 80 in which the MG 80 is switched from the standard state to the irreversible demagnetization state.

That is, the basic magnetic flux change amount estimation value $\Delta\Phi\_b$ is corrected in the standard state of the MG 80 based on the first correction map value so that the d axis real voltage Vd_real becomes equal to the d axis standard voltage Vd_std in the standard state of the MG 80. The basic magnetic flux change amount estimation value $\Delta\Phi\_b$ is corrected in the transition state of the MG 80 based on the second correction map value so that the d axis real voltage Vd_real becomes equal to the d axis standard voltage Vd_std during the transition state of the MG 80.

In order to correctly detect the occurrence of demagnetization of the permanent magnets of the MG 80, the MG control device 20 according to the first exemplary embodiment switches the first correction map value and the second correction map value according to a magnitude in reduction of the magnetic flux change amount estimation value $\Delta\Phi$.

A description will be given of the detailed structure of the magnetic flux change amount estimation part 30 with reference to FIG. 4.

Figure 4:
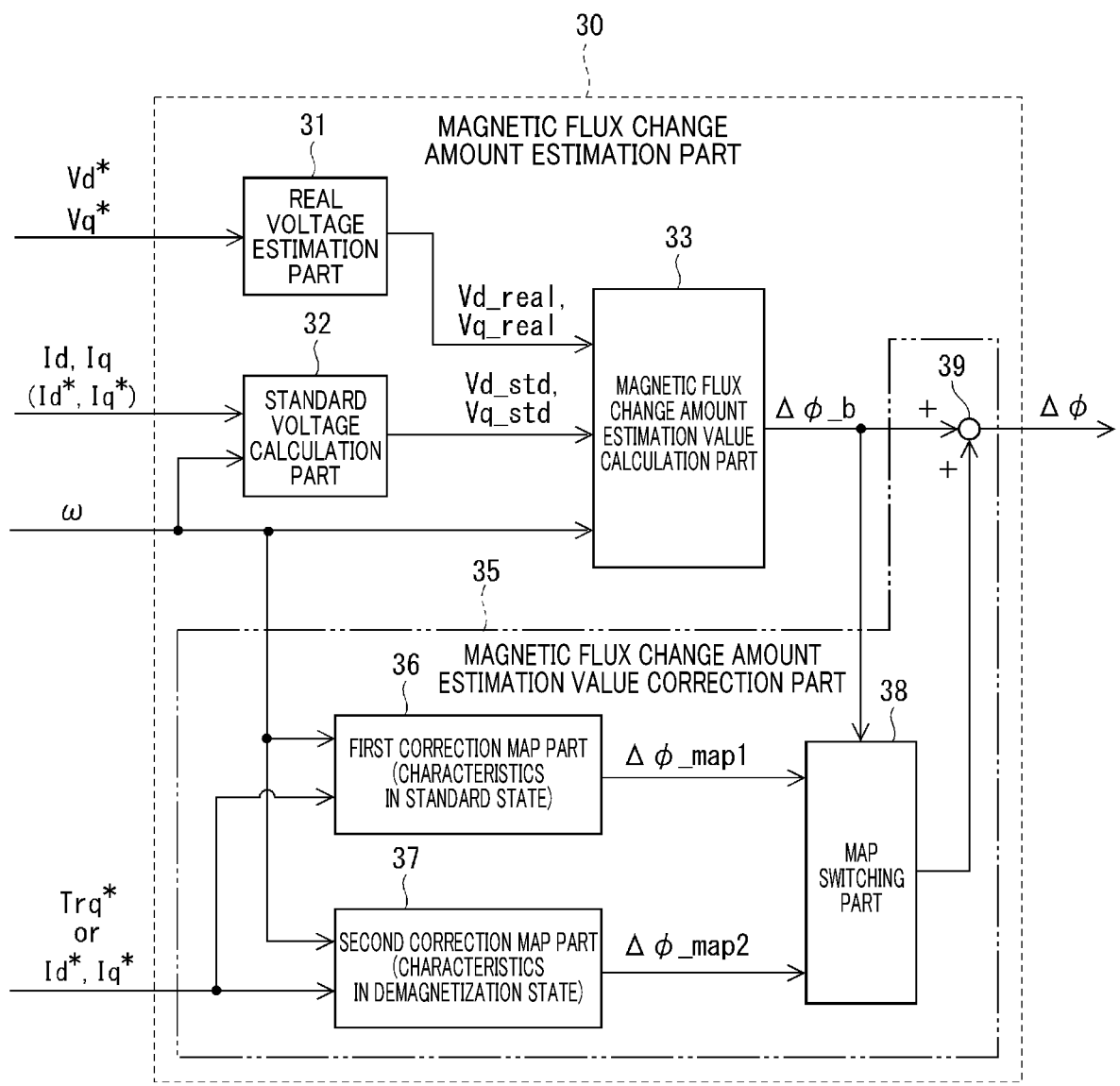
FIG. 4 is a block diagram showing a magnetic flux change amount estimation part in the MG control device according to a first exemplary embodiment of the present disclosure.

FIG. 4 is a block diagram showing the magnetic flux change amount estimation part 30 in the MG control device 20 according to the exemplary embodiment shown in FIG. 1. As shown in FIG. 4, the magnetic flux change amount estimation part 30 has a real voltage estimation part 31, a standard voltage calculation part 32, a magnetic flux change amount estimation value calculation part 33 and a magnetic flux change amount estimation value correction part 35. The magnetic flux change amount estimation value correction part 35 has the first correction map part 36, the second correction map part 37, a map switching part 38 and a correction calculation part 39.

The real voltage estimation part 31 estimates the d axis real voltage Vd_real and the q axis real voltage Vq_real, to be supplied to the MG 80, on the basis of the voltage instruction values Vd*, Vq*.

It is acceptable for the real voltage estimation part 31 to transmit corrected values of the voltage instruction values Vd*, Vq* as the d axis real voltage Vd_real and the q axis real voltage Vq_real.

It is acceptable for the real voltage estimation part 31 to directly receive the voltage detection values, transmitted from the voltage sensor, as the d and q axis current detection values Id and Iq.

The standard voltage calculation part 32 calculates the d axis standard voltage Vd_std and the q axis standard voltage Vq_std on the basis of the electrical angular speed $\omega$ and the current detection values Id, Iq (or the current instruction values Id*, Iq*) of the MG 80 by using Equation (1).

It is not necessary to use a fixed value as those standard voltages Vd_std and Vq_std. It is acceptable to determine the d axis standard voltage Vd_std and the q axis standard voltage Vq_std on the basis of the winding resistance value, the inductance of the windings, and temperature characteristics of the permanent magnets of the MG 80. It is further acceptable for the standard voltage calculation part 32 to learn the voltage value varying based on the operation point and an ambient temperature when no irreversible demagnetization has occurred, and to determine the d axis standard voltage Vd_std and the q axis standard voltage Vq_std based on the learned voltage values. It is acceptable for the real voltage estimation part 31 to use Equation (5) which considers interlinked magnetic fluxes $\lambda q$, $\lambda d$ instead of using Equation (1).

$$\left. \begin{array}{l} Vd\_std = -\omega \times \lambda q + R \times Id \\ Vq\_std = \omega \times \lambda d + R \times Iq \end{array} \right\} \quad (5)$$

The real voltage estimation part 31 transmits the estimated d axis real voltage Vd_real and the estimated q axis real voltage Vq_real to the magnetic flux change amount estimation value calculation part 33. The standard voltage calculation part 32 transmits the calculated d axis standard voltage Vd_std and the calculated q axis standard voltage Vq_std to the magnetic flux change amount estimation value calculation part 33.

The magnetic flux change amount estimation value calculation part 33 calculates a basic magnetic flux change amount estimation value $\Delta\Phi\_b$ by using Equation (6) of the Vd-Vq method.

In order to distinguish the estimation on the basis of the Vd-Vq method from the estimation calculation on the basis of the Vq method, the basic magnetic flux change amount estimation value $\Delta\Phi\_b$, calculated by the magnetic flux change amount estimation value calculation part 33 is used as a first magnetic flux change amount estimation value $\Delta\Phi 1$.

The magnetic flux change amount estimation value calculation part 33 calculates a deviation of a value from the q axis standard voltage Vq_std in Equation (6), where the value is obtained by multiplying the q axis real voltage Vq_real and a ratio of the d axis standard voltage Vd_std and the d axis real voltage Vd_real (Vd_std/Vd_real).

The first term in Equation (6) is used as the q axis real voltage correction value [Vq]. The deviation of the q axis real voltage correction value [Vq] from the q axis standard voltage Vq_std corresponds to a first q axis voltage change amount ΔVq1.

$$\Delta\phi1 = \frac{Vq\_real \times \frac{Vd\_std}{Vd\_real} - Vq\_std}{\omega} = \frac{[Vq] - Vq\_std}{\omega} = \frac{\Delta Vq1}{\omega} \quad (6)$$

A description will now be given of a comparison of the magnetic flux change amount estimation performed by the Vd-Vq method and the Vq method with reference to FIG. 5.

Figure 5:
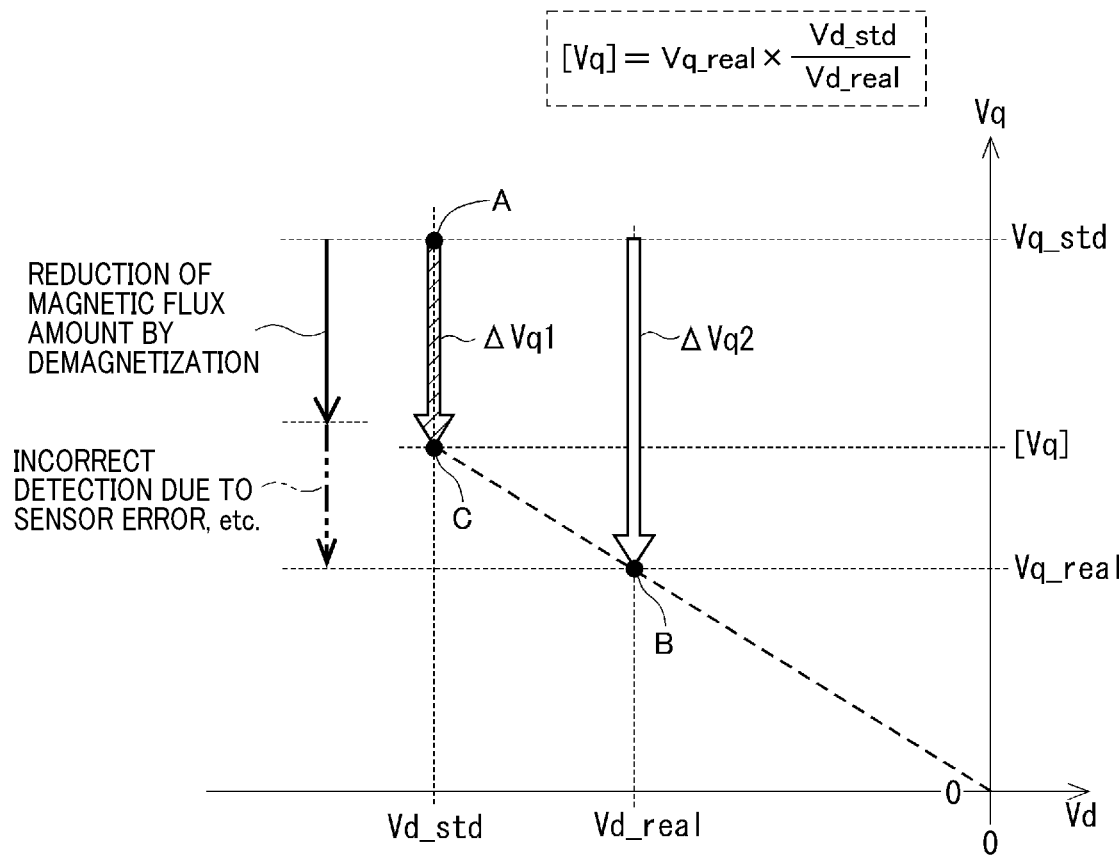
FIG. 5 is a view showing comparison results of the magnetic flux change amount estimation based on a Vd-Vq method and a Vq method performed by the MG control device according to the exemplary embodiments of the present disclosure.

FIG. 5 is a view showing the comparison results of the magnetic flux change amount estimation based on the Vd-Vq method and the Vq method performed by the MG control device 20 according to the exemplary embodiments of the present disclosure.

In the Vd-Vq coordinate system shown in FIG. 5, the reference character A designates the intersection point between the d axis standard voltage Vd_std and the q axis standard voltage Vq_std. The reference character B designates the intersection point between the d axis real voltage Vd_act and the q axis real voltage Vq_act. The reference character C designates the intersection point between the d axis standard voltage Vd_std and the q axis real voltage corrected value Vq. The intersection point C is a point extended from the point B on a straight line between the origin in the Vd-Vq coordinate system and the point B.

The second q axis voltage change amount ΔVq2 obtained by the Vq method corresponds a q axis voltage change amount from the intersection point A to the intersection point B, where the intersection point A and the intersection point B have a different q axis voltage Vd. That is, the second q axis voltage change amount ΔVq2 is an amount obtained by adding a magnetic flux reduction amount caused by demagnetization of the permanent magnets of the MG 80 and an incorrect value caused by a sensor detection error, etc.

On the other hand, the first q axis voltage change amount ΔVq1 obtained by the Vd-Vq method corresponds to a q axis voltage change amount from the intersection point A to the intersection point C.

Using the first q axis voltage change amount ΔVq1 reduces the sensor detection inaccuracy, i.e. reduces an amount generated by incorrect detection, for example, reduces the sensor detection inaccuracy when compared with using the second q axis voltage change amount ΔVq2 obtained by the Vq method. Accordingly, the first q axis voltage change amount ΔVq1 obtained by the Vd-Vq method corresponds with high accuracy to the amount reflected by the magnetic flux reduction amount caused by demagnetization of the permanent magnets of the MG 80.

As previously described, the magnetic flux change amount estimation value calculation part 33 calculates the basic magnetic flux change amount estimation value ΔΦ_b on the basis of Equation (6) of the Vd-Vq method.

Next, the magnetic flux change amount estimation value correction part 35 changes the magnetic flux change amount estimation value ΔΦ, to be transmitted to the magnetic flux detection part 40, according to the detection threshold value ΔΦ_diag on the basis of the characteristic change of the MG 80 when the demagnetization has occurred in the permanent magnets of the MG 80. In the first exemplary embodiment, the magnetic flux change amount estimation value correction part 35 corrects the basic magnetic flux change amount estimation value ΔΦ_b so as to obtain the magnetic flux change amount estimation value ΔΦ on the basis of a fixed value of the detection threshold value ΔΦ_diag.

The first correction map part 36 and the second correction map part 37 receive the torque instruction value Trq*, the electrical angular speed ω, and the d axis current instruction value Id* or the q axis current instruction value Iq*. Because there is a correlation between the torque instruction value Trq*, the d axis current instruction value Id*, and the q axis current instruction value Iq*, it is possible to convert between them. It is acceptable for the first correction map part 36 and the second correction map part 37 to receive the torque detection value instead of the torque instruction value Trq*, and to receive the current detection values Id, Iq instead of the current instruction values Id*, Iq*.

The first correction map part 36 uses the characteristics of the MG 80 in the standard state of the MG 80 when no demagnetization has occurred in the permanent magnets of the MG 80. The first correction map part 36 calculates a first correction map value ΔΦ_map1. The basic magnetic flux change amount estimation value ΔΦ_b is corrected based on the first correction map value ΔΦ_map1 so that the d axis real voltage Vd_real becomes equal to the d axis standard voltage Vd_std.

The second correction map part 37 uses the characteristics of the MG 80 in the transition state of the MG 80 when the operation state of the MG 80 transits from the standard state to the irreversible demagnetization state. Similar to the first correction map part 36, the second correction map part 37 calculates a second correction map value ΔΦ_map2. The basic magnetic flux change amount estimation value ΔΦ_b is corrected based on the second correction map value ΔΦ_map2 so that the d axis real voltage Vd_real becomes equal to the d axis standard voltage Vd_std.

The map switching part 38 compares at least one of map switching threshold values ΔΦ_mapx with the basic magnetic flux change amount estimation value ΔΦ_b, where each of the map switching threshold values ΔΦ_mapx is more than the detection threshold value ΔΦ_diag.

When the basic magnetic flux change amount estimation value ΔΦ_b is more than the map switching threshold value ΔΦ_mapx, the map switching part 38 selects and uses the first map correction value ΔΦ_map1 transmitted from the first correction map part 36. On the other hand, when the basic magnetic flux change amount estimation value ΔΦ_b is not more than the map switching threshold value ΔΦ_mapx, the map switching part 38 selects and uses the second correction map value ΔΦ_map2 transmitted from the second correction map part 37. The feature of the map switching threshold values ΔΦ_mapx will be explained later with reference to FIG. 7.

The correction calculation part 39 adds the selected correction map value, i.e. one of the first correction map value ΔΦ_map1 and the second correction map value ΔΦ_map2 selected by the map switching part 38, and the basic magnetic flux change amount estimation value ΔΦ_b together in order to correct the basic magnetic flux change amount estimation value ΔΦ_b. The correction calculation part 39 transmits, to the demagnetization detection part 40, the corrected basic magnetic flux change amount estimation value ΔΦ_b as the magnetic flux change amount estimation value ΔΦ.

That is, in the structure of the magnetic flux change amount estimation part 30 shown in FIG. 4, the first correction map part 36 transmits the first correction map value ΔΦ_map1 to the map switching part 38. The second correction map part 37 transmits the second correction map value ΔΦ_map2 to the map switching part 38. The map switching part 38 selects one of the first correction map value ΔΦ_map1 and the second correction map value ΔΦ_map2. However, the concept of the present disclosure is not limited by this structure. For example, it is acceptable for the map switching part 38 to select one of the first correction map value ΔΦ_map1 and the second correction map value ΔΦ_map2, and to instruct one of the first correction map part 36 and the second correction map part 37 to generate the correction map value.

A description will be given of the magnetic flux change amount estimation calculation process and the demagnetization detection process with reference to FIG. 6.

Figure 6:
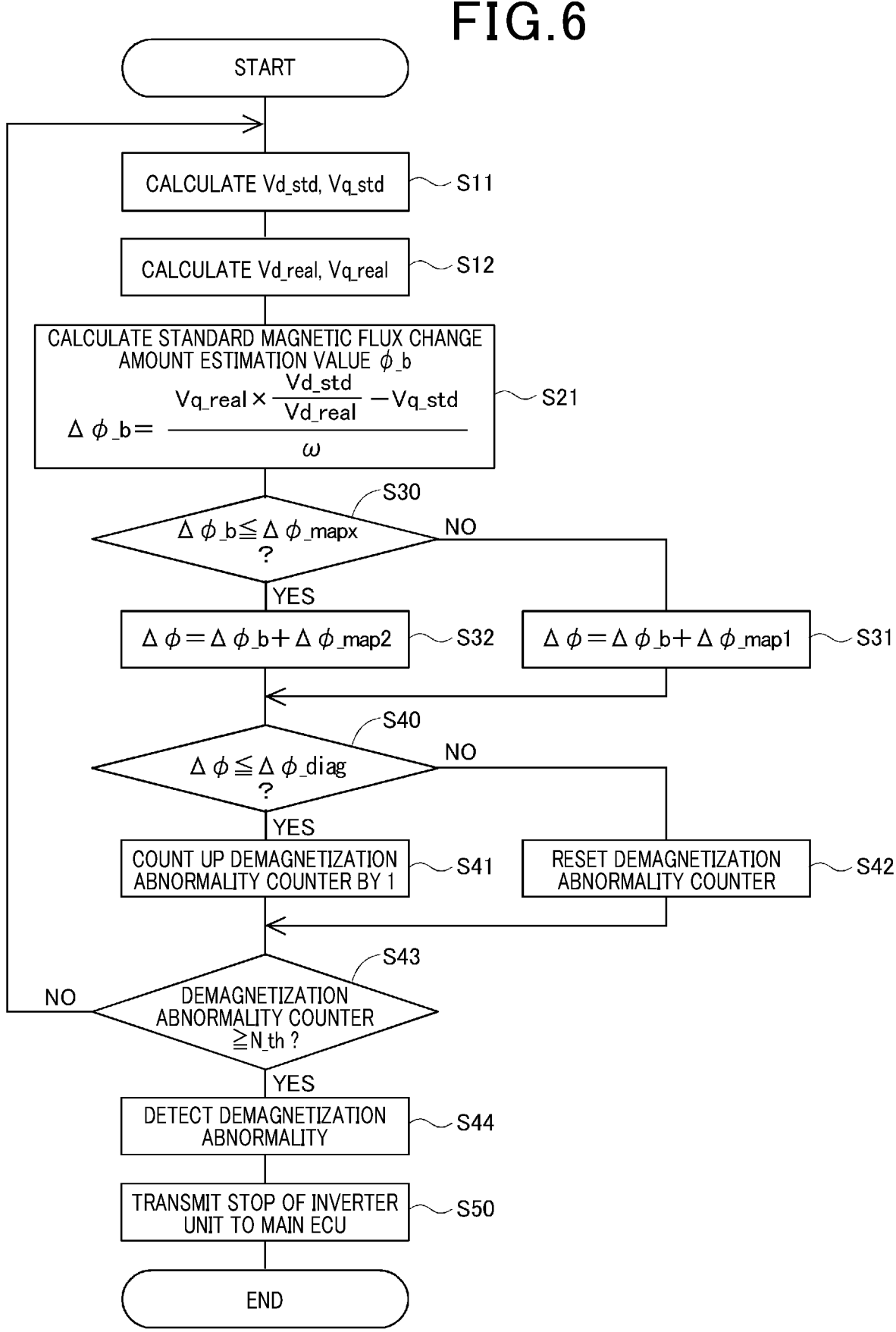
FIG. 6 is a view showing a flow chart of estimating a magnetic flux change amount in a motor generator and of detecting occurrence of demagnetization of permanent magnets in the motor generator performed by the MG control device according to the first exemplary embodiment of the present disclosure.

FIG. 6 is a view showing a flow chart of estimating a magnetic flux change amount as the magnetic flux change amount estimation value Φ and of detecting occurrence of demagnetization of the permanent magnets in the MG 80 performed by the MG control device 20 according to the exemplary embodiment of the present disclosure.

In step S11 shown in FIG. 6, the standard voltage calculation part 32 calculates the d axis standard voltage Vd_std and the q axis standard voltage Vq_std on the basis of the electrical angular speed ω and the current detection values Id, Iq (or the current instruction values Id*, Iq*) of the MG 80 by using Equation (1). The operation flow progresses to step S12.

In step S12, the real voltage estimation part 31 calculates the d axis real voltage Vd_real and the q axis real voltage Vq_real, to be supplied to the MG 80. The operation flow progresses to step S21.

In step S21, the magnetic flux change amount estimation value correction part 35 calculates the basic magnetic flux change amount estimation value ΔΦ_b by using Equation (6) of the Vd-Vq method. The operation flow progresses to step S30.

In step S30, the map switching part 38 detects whether the basic magnetic flux change amount estimation value ΔΦ_b is not more than the map switching threshold values ΔΦ_mapx When the detection result in step S30 indicates negative ("NO" in step S30), i.e. indicates that the basic magnetic flux change amount estimation value ΔΦ_b is more than the map switching threshold values ΔΦ_mapx, and the operation flow progresses to step S31.

In step S31, the correction calculation part 39 adds the first correction map value ΔΦ_map1 to the basic magnetic flux change amount estimation value ΔΦ_b so as to generate the magnetic flux change amount estimation value ΔΦ. The correction calculation part 39 transmits the magnetic flux change amount estimation value ΔΦ as the addition result to the demagnetization detection part 40.

On the other hand, the detection result in step S30 indicates positive ("YES" in step S30), i.e. indicates that the basic magnetic flux change amount estimation value ΔΦ_b is not more than the map switching threshold values ΔΦ_mapx, and the operation flow progresses to step S32.

In step S32, the correction calculation part 39 adds the output map value, i.e. the second correction map value ΔΦ_map2 to the basic magnetic flux change amount estimation value ΔΦ_b, and transmits the magnetic flux change amount estimation value ΔΦ as the addition result to the demagnetization detection part 40

The detailed explanation of step S30 to step S32 will be explained with reference to FIG. 7.

Figure 7:
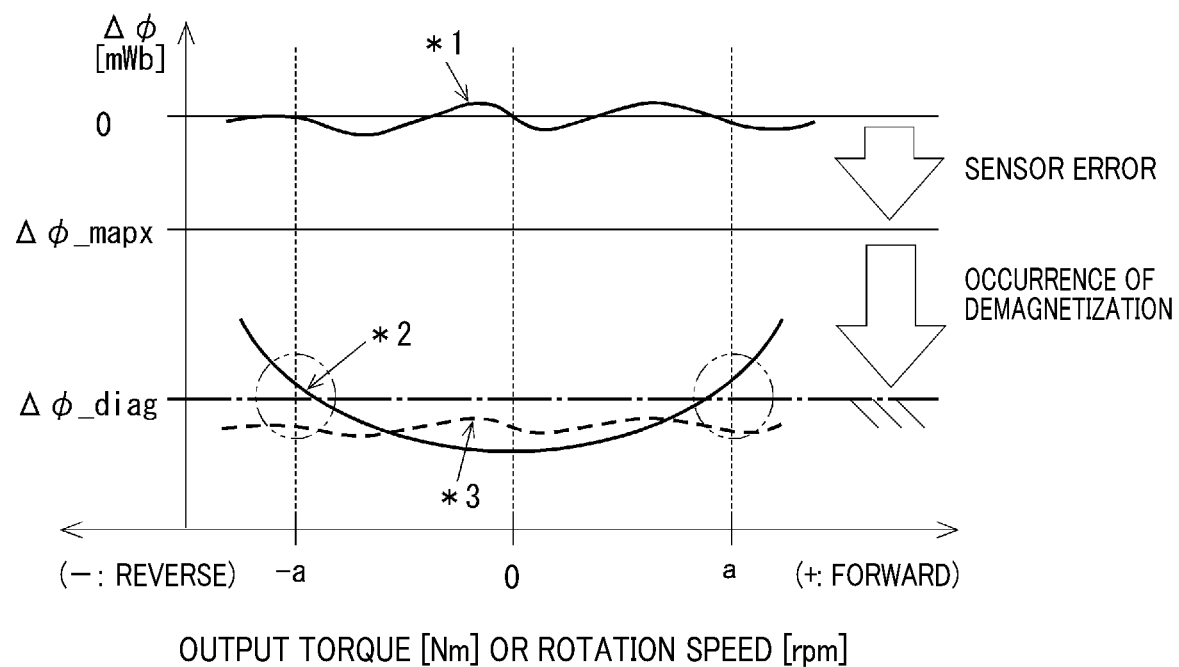
FIG. 7 is a view showing a magnetic flux change amount estimation value before and after the correction by the MG control device according to the first exemplary embodiment of the present disclosure.

FIG. 7 is a view showing the magnetic flux change amount estimation value before and after the correction by the MG control device 20 according to the first exemplary embodiment of the present disclosure. In FIG. 7, the vertical axis indicates the magnetic flux change amount estimation value ΔΦ [mWb]. The zero point designated by reference number 0 represents an ideal state when no demagnetization of the permanent magnets in the MG 80 has occurred. The detection threshold value ΔΦ_diag has a negative value of the magnetic flux change amount estimation value ΔΦ.

The MG control device 20 according to the exemplary embodiments determines the map switching threshold values ΔΦ_mapx which is larger than the detection threshold value ΔΦ_diag. For example, the MG control device 20 determines that the detection threshold value ΔΦ_diag is −40 [mWb], and the map switching threshold values ΔΦ_mapx is −25 [mWb].

In the area having a value which is more than the map switching threshold values ΔΦ_mapx, the magnetic flux change amount estimation value ΔΦ is reduced due to an estimation error of the magnetic flux change amount estimation value ΔΦ caused by incorrect sensor detection even if the MG 80 operates in the standard state in which no demagnetization has occurred. The first correction map part 36 calculates and transmits the first correction map value ΔΦ_map1 on the basis of the characteristics of the MG 80 in the standard state.

On the other hand, in the area having a value which is not more than the map switching threshold values ΔΦ_mapx, an actual demagnetization has occurred. The second correction map part 37 calculates and transmits the second correction map value ΔΦ_map2 on the basis of the characteristics of the MG 80 under a state from the standard state to the irreversible demagnetization state. That is, it is possible to use the map switching threshold values ΔΦ_mapx so as to detect occurrence of demagnetization of the permanent magnets of the MG 80.

The horizontal axis in FIG. 7 represents the output torque [Nm] or the rotation speed [rpm] of the MG 80. When the MG 80 rotates in a forward direction, each of the output torque and the rotation speed of the MG 80 has a positive value, and when in a reverse direction, each of the output torque and the rotation speed has a negative value. The first exemplary embodiment uses the detection threshold value ΔΦ_diag of a constant value even if the output torque and the rotation speed of the MG 80 are changed.

There is a relationship between the output torque or the rotation speed of the MG 80 and the detection threshold value ΔΦ_diag, the magnetic flux change amount estimation value ΔΦ which has been corrected by the first correction map part 36 becomes a value close to zero [mWb] as designated by the reference character (*1) shown in FIG. 7. Accordingly, a probability of an incorrect detection of demagnetization occurring becomes low.

The first correction map part 36 does not consider the MG characteristics such as inductance, etc. when demagnetization has occurred in the permanent magnets of the MG 80. Accordingly, when demagnetization has occurred in the permanent magnets of the MG 80, the magnetic flux change amount depends on the output torque or the rotation speed of the MG 80, as designated by reference character (*2) shown in FIG. 7. That is, FIG. 7 shows the magnetic flux change amount estimation value ΔΦ corrected by the first correction map part 36 has a minimum value when the output torque or the rotation speed of the MG 80 is zero, and the magnetic flux change amount estimation value as the magnetic flux change amount estimation value as the estimated value increases along a curved line (i.e. approaches to zero) according to the increasing of the absolute value of the output torque or the rotation speed of the MG 80.

When an absolute value of the output torque or the rotation speed of the MG 80 is a value designated by reference character a (see FIG. 7), because the magnetic flux change amount estimation value ΔΦ excesses the detection threshold value ΔΦ_diag, the demagnetization detection part 40 causes incorrect detection in which the detection results indicate no occurrence of the demagnetization although demagnetization has occurred.

In order to avoid such incorrect detection, the magnetic flux change amount estimation value ΔΦ which has been corrected by the second correction map part 37 eliminates the influence of the output torque or the rotation speed of the MG 80, as designated by reference character (*3) shown in FIG. 7. As a result, it is possible for the demagnetization detection part 40 to perform the correct detection on the basis of the comparison result using the detection threshold value ΔΦ_diag without influence of the output torque or the rotation speed of the MG 80.

In step S40, when receiving the magnetic flux change amount estimation value ΔΦ transmitted from the correction calculation part 39 in the magnetic flux change amount estimation part 30, the demagnetization detection part 40 detects whether the magnetic flux change amount estimation value ΔΦ is not more than the predetermined detection threshold value ΔΦ_diag.

When the detection result in step S40 indicates positive ("YES" in step S40), i.e. indicates that the magnetic flux change amount estimation value ΔΦ is not more than the predetermined detection threshold value ΔΦ_diag, and the operation flow progresses to step S41.

In step S41, the MG control device 20 increments the value of a demagnetization abnormality counter by one. The operation flow progresses to step 43.

On the other hand, when the detection result in step S40 indicates negative ("NO" in step S40), i.e. indicates that the magnetic flux change amount estimation value ΔΦ is more than the predetermined detection threshold value ΔΦ_diag, and the operation flow progresses to step S42.

In step S42, the MG control device 20 resets the value of the demagnetization abnormality counter to zero. The operation flow progresses to step 43.

In step S43, the MG control device 20 detects whether the value of the demagnetization abnormality counter reaches an abnormality detection threshold value N_th.

When the detection result in step S43 indicates negative ("NO" in step S43), i.e. indicates that the value of the demagnetization abnormality counter does not reach the abnormality detection threshold value N_th, the operation flow returns to step S11. In this case, the demagnetization detection part 40 in the MG control device 20 restarts the calculation process of estimating the magnetic flux change amount value ΔΦ.

On the other hand, when the detection result in step S43 indicates positive ("YES" in step S43), i.e. indicates that the value of the demagnetization abnormality counter has reached the abnormality detection threshold value N_th, the operation flow progresses to step S44.

In step S44, the demagnetization detection part 40 determines the occurrence of demagnetization abnormality of the permanent magnets of the MG 80.

As previously described, the determination of demagnetization abnormality of the permanent magnets in the MG 80 makes it possible to prevent incorrect detection of occurrence of the irreversible demagnetization abnormality due to a temporary reversible demagnetization and estimation error when no irreversible demagnetization has occurred. However, when the frequency of occurrence of the incorrect detection is low, it is acceptable for the demagnetization detection part 40 to set the abnormality detection threshold value N_th to one so as to quickly detect the occurrence of demagnetization abnormality.

When the occurrence of demagnetization abnormality is detected, the MG control device 20 prohibits the switching operation of the inverter 62, and transmits failure information to the main ECU 50. When receiving the failure information, the main ECU 50 instructs the display device 55, for example the meter ECU, etc. to display the failure information. In addition, when the MG control device 20 according to the exemplary embodiment is mounted on a hybrid vehicle, the main ECU 50 switches to the evacuation travel mode which uses the MG 80.

As previously described, in the structure of the magnetic flux change amount estimation part 30 in the MG control device 20 according to the first exemplary embodiment, the magnetic flux change amount estimation value calculation part 33 calculates the magnetic flux change amount estimation value ΔΦ on the basis of the information regarding the d axis voltage in addition to the information regarding the q axis voltage. This makes it possible to reduce, to as small as possible, influence of sensor error, etc. which causes incorrect detection, and to increase estimation accuracy of the magnetic flux change amount estimation value ΔΦ.

Further, the magnetic flux change amount estimation value correction part 35 has the first correction map part 36 and the second correction map part 37 which are selected at the transition of the permanent magnets of the MG 80 from the standard state to the irreversible demagnetization state so that the d axis real voltage becomes equal to the d axis standard voltage. This makes it possible for the MG control device 20 to correctly detect occurrence of demagnetization of the permanent magnets of the MG 20 based on the characteristics of the AC motor during the demagnetization state.

Second Exemplary Embodiment

A description will be given of the MG control device 20 as the control device for AC motors according to the second exemplary embodiment of the present disclosure with reference to FIG. 8.

Figure 8:
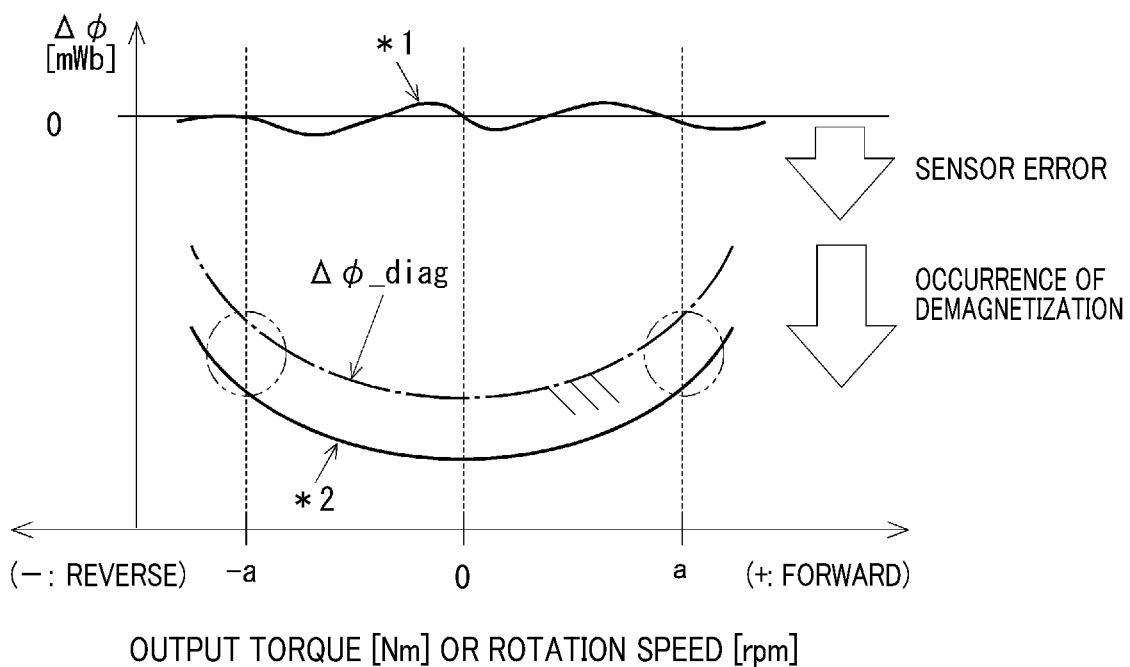
FIG. 8 is a view explaining a relationship between a magnetic flux change amount estimation value and a detection threshold value obtained by the MG control device according to a second exemplary embodiment of the present disclosure.

FIG. 8 is a view explaining a relationship between a magnetic flux change amount estimation value and a detection threshold value obtained by the MG control device 20 according to the second exemplary embodiment of the present disclosure. The magnetic flux change amount estimation value correction part 35 shown in FIG. 8 has a structure which is different from the structure of the magnetic flux change amount estimation value correction part 35 in the MG control device 20 according to the first exemplary embodiment shown in FIG. 4. That is, the magnetic flux change amount estimation value correction part 35 first exemplary embodiment shown in FIG. 4 adjusts the basic magnetic flux change amount estimation value ΔΦ_b relative to the detection threshold value ΔΦ_diag.

On the other hand, the magnetic flux change amount estimation value correction part 35 according to the second exemplary embodiment shown in FIG. 8 does not directly adjust the basic magnetic flux change amount estimation value ΔΦ_b, and adjusts the detection threshold value ΔΦ_diag so as to indirectly adjust the basic magnetic flux change amount estimation value ΔΦ_b.

As shown in FIG. 8, the detection threshold value ΔΦ_diag has a minimum value when the output torque or the rotation speed of the MG 80 is zero, and increases (i.e. approaches zero) along a curved line according to increasing of an absolute value of the output torque or the rotation speed of the MG 80. That is, the detection threshold value ΔΦ_diag in the second exemplary embodiment is changed along a curved line, which is approximately similar to the curved line of the magnetic flux change amount estimation value ΔΦ which is changed in the first exemplary embodiment using the first correction map.

Accordingly, it is possible to correctly detect occurrence of demagnetization in the permanent magnets of the MG 80 because the magnetic flux change amount estimation value ΔΦ is lower than the detection threshold value ΔΦ_diag at [a] shown in FIG. 8 which represents an absolute value of the output torque or the rotation speed of the MG 80.

In the MG control device 20 according to the second exemplary embodiment, it is acceptable to change the detection threshold value ΔΦ_diag on the basis of the change of the d axis current Id and the q axis current because there is a correlation between the d axis current Id and the q axis current and the output torque of the MG 80.

As previously described, when the MG control device 20 has a structure in which the magnetic flux change amount estimation value correction part 35 adjusts the detection threshold value ΔΦ_diag on the basis of the operation state of the MG 80, it is possible to correctly detect occurrence of demagnetization of the permanent magnets of the MG 80 based on the characteristics of the MG 80 in the demagnetization state.

Other Modifications (a) In the MG control device 20 according to the first exemplary embodiment previously described, it is possible to use at least two second correction map parts corresponding to steps from the standard state to the irreversible demagnetization state of the permanent magnets of the MG 80. In this modification, the MG control device 20 prepares and switches at least two map switching threshold values ΔΦ_mapx which correspond to at least two second correction map parts, respectively. This modification makes it possible to detect occurrence of demagnetization of the permanent magnets of the MG 80 with more high accuracy while switching the second correction map parts on the basis of the map switching threshold values ΔΦ_mapx.

(b) It is acceptable for the magnetic flux change amount estimation value correction part 35 according to the first exemplary embodiment to correct the basic magnetic flux change amount estimation value ΔΦ_b instead of using the correction maps. Further, it is acceptable to correct the basic magnetic flux change amount estimation value ΔΦ_b by multiplexing the basic magnetic flux change amount estimation value ΔΦ_b with a correction ratio or by using a combination of the multiplication and the addition of them, instead of performing the addition of the basic magnetic flux change amount estimation value ΔΦ_b with the selected map value transmitted from the map switching part 38.

(c) In the exemplary embodiment of the present disclosure previously described, the MG control device 20 as the control device for AC motors is applied to hybrid vehicles and electric vehicles. However, the concept of the present disclosure is not limited by this exemplary embodiment. It is possible to apply the MG control device 20 to AC motors equipped with permanent magnets in various fields. It is possible to MG control device 20 according to the exemplary embodiment to poly-phase AC motors in addition to three phase AC motors.

There is a known control device for AC motors. The known control device detects occurrence of demagnetization in the permanent magnets in the AC motor due to the reduction of the output torque of the AC motor caused by irreversible demagnetization, in particular, at a high temperature. Accordingly, it is difficult for the known control device to correctly detect the occurrence of demagnetization of the permanent magnets in the AC motor with high accuracy. For example, there is a motor drive device which detects a d axis standard voltage value on the basis of a current and a rotation speed of the AC motor when no demagnetization has occurred in the AC motor. The motor drive device estimates a demagnetization amount on the basis of a comparison result between the voltage standard value and a real q axis voltage. The motor drive device detects occurrence of demagnetization of the permanent magnets in the AC motor when the real q axis voltage is smaller than the voltage standard value.

A standard magnetic flux amount is determined in a standard state in which no demagnetization has occurred in the permanent magnets of the MG. A magnet flux change amount represents a deviation of a magnet flux amount of the permanent magnets from a standard magnet flux amount in the standard state. In the standard state of the permanent magnets of the MG, the axis standard voltage and the q axis standard voltage are supplied to the MG. The known control device calculates a magnet flux change amount estimation value on the basis of a deviation of the q axis real voltage from the q axis standard voltage.

In particular, the known control device calculates a magnetic flux change amount estimation value by using information of the q axis voltage only, not using information of the d axis voltage in addition to the q axis voltage. Accordingly, the estimated magnetic flux is easily influenced by detection error of a voltage sensor, etc. It is accordingly difficult to correctly detect whether the detected q axis voltage is changed due to demagnetization of the permanent magnets of the MG or due to the sensor detection error. This causes estimation accuracy of the magnetic flux change amount and reduces the demagnetization detection reliability.

The known control device considers a magnet flux change only, and does not consider characteristic change of an AC motor such as inductance as a device constant to be used in a voltage equation. This reduces estimation accuracy of the magnetic flux change amount estimation value of the permanent magnets of the AC motor, and often causes incorrect estimation of the magnetic flux change amount.

On the other hand, as previously explained and described in detail, the MG control device as the control device for AC motors according to the present disclosure avoids these drawbacks such as occurrence of estimation error. Further, it is possible for the present disclosure to provide a control method of performing a power supply control of an alternating current motor comprising permanent magnets. The control device for alternating current motors as previously described performs the control method of performing the power supply control of an alternating current motor.

The voltage instruction calculation part corresponds to the voltage instruction calculation part 24. The electric power conversion unit corresponds to the inverter unit 62. The magnetic flux change amount estimation part corresponds to the magnetic flux change amount estimation part 30 and the processes in step S11, step S12, step S21, step S30, step S31 and step S32. The demagnetization detection part corresponds to the demagnetization detection part 40 and the processes in step S40, step S41, step S42, step S43 and step S44, for example.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A control device for alternating current motors configured to perform a power supply control of an alternating current motor comprising permanent magnets, the control device comprising a computer system including a central processing unit, the computer system being configured to provide:
    a voltage instruction calculation part calculating voltage instruction values on the basis of an output torque instruction to be supplied to the alternating current motor;
    an electric power conversion unit converting a direct current power to an alternating current power on the basis of the voltage instruction values, and supplying the alternating current power to the alternating current motor;
    a magnetic flux change amount estimation part calculating a magnetic flux change amount estimation value which is a deviation of a real magnetic flux amount of the permanent magnets of the alternating current motor from a standard magnetic flux amount, where the standard magnetic flux amount of the permanent magnets is an amount when no demagnetization has occurred in the permanent magnets; and
    a demagnetization detection part detecting occurrence of demagnetization of the permanent magnets when the magnetic flux change amount estimation value calculated by the magnetic flux change amount estimation part is lower than a detection threshold value, wherein
    the magnetic flux change amount estimation part comprises:
    a real voltage estimation part estimating a d axis real voltage and a q axis real voltage to be supplied to the alternating current motor, or obtaining voltage detection values as the d axis real voltage and the q axis real voltage, correlated with the voltage instruction values;
    a standard voltage calculation part calculating a d axis standard voltage and a q axis standard voltage to be supplied to the alternating current motor in a standard state of the alternating current motor on the basis of an electrical angular speed and a current of the alternating current motor;
    a magnetic flux change amount estimation value calculation part calculating a basic magnetic flux change amount estimation value on the basis of a deviation of a specific value from the q axis standard voltage, where the specific value is obtained by multiplying a q axis real voltage with a ratio of the d axis standard voltage and the d axis real voltage; and
    a magnetic flux change amount estimation value correction part calculating the magnetic flux change amount estimation value by correcting the basic magnetic flux change amount estimation value relatively to the detection threshold value on the basis of characteristic change of the alternating current motor in a demagnetization state of the permanent magnets of the alternating current motor.

2. The control device for alternating current motors according to claim 1, wherein
    the magnetic flux change amount estimation value correction part calculates a correction value which corresponds to the characteristic change of the alternating current motor in the demagnetization state of the permanent magnets of the alternating current motor, corrects the basic magnetic flux change amount estimation value on the basis of the correction value, and transmits, to the demagnetization detection part, the corrected basic magnetic flux change amount estimation value as the magnetic flux change amount estimation value,
    wherein
    the magnetic flux change amount estimation value correction part comprises a first correction map part, a second correction map part, a map switching part and a correction calculation part,
    the first correction map part generates a first correction map value as the correction value, with which the basic magnetic flux change amount estimation value is corrected so that the d axis real voltage becomes equal to the d axis standard voltage on the basis of one of an output torque, a current and an electrical angular speed of the alternating current motor based on characteristics of the alternating current motor in the standard state in which no demagnetization occurs in the permanent magnets of the alternating current motor,
    the second correction map part generates a second correction map value as the correction value, with which the basic magnetic flux change amount estimation value is corrected so that the d axis real voltage becomes equal to the d axis standard voltage on the basis of one of the output torque, the current and the electrical angular speed of the alternating current motor based on characteristics of the alternating current motor in a transition state when the alternating current motor transits from the standard state to an irreversible demagnetization state,
    the map switching part compares a map switching threshold value, which is a negative value which is more than the detection threshold value, with the basic magnetic flux change amount estimation value, and selects the first correction map value when the basic magnetic flux change amount estimation value $\Delta\Phi\_b$ is more than the map switching threshold value, and selects the second correction map value when the basic magnetic flux change amount estimation value $\Delta\Phi\_b$ is not more than the map switching threshold value, and
    the correction calculation part corrects the basic magnetic flux change amount estimation value $\Delta\Phi\_b$ by using one of the first correction map value and the second correction map value selected by the map switching part, and transmits the corrected basic magnetic flux change amount estimation value as the magnetic flux change amount estimation value to the demagnetization detection part.

3. The control device for alternating current motors according to claim 1, wherein
    the detection threshold value is adjusted on the basis of the one of the output torque, the current and the electrical angular speed of the alternating current motor.

4. A control method of performing a power supply control of an alternating current motor comprising permanent magnets, comprising steps of:
- calculating voltage instruction values on the basis of an output torque instruction to be supplied to the alternating current motor;
- converting a direct current power to an alternating current power on the basis of the voltage instruction values, and supplying the alternating current power to the alternating current motor;
- calculating a magnetic flux change amount estimation value which is a deviation of a real magnetic flux amount of the permanent magnets of the alternating current motor from a standard magnetic flux amount, where the standard magnetic flux amount of the permanent magnets is an amount when no demagnetization has occurred in the permanent magnets; and
- detecting occurrence of demagnetization of the permanent magnets when the magnetic flux change amount estimation value is lower than a detection threshold value, wherein
the estimation of the magnetic flux change amount of the permanent magnets of the alternating current motor comprises steps of:
- estimating a d axis real voltage and a q axis real voltage to be supplied to the alternating current motor, or obtaining voltage detection values as the d axis real voltage and the q axis real voltage, correlated with the voltage instruction values;
- calculating a d axis standard voltage and a q axis standard voltage to be supplied to the alternating current motor in a standard state of the alternating current motor on the basis of an electrical angular speed and a current of the alternating current motor;
- calculating a basic magnetic flux change amount estimation value on the basis of a deviation of a specific value from the q axis standard voltage, where the specific value is obtained by multiplying a q axis real voltage with a ratio of the d axis standard voltage and the d axis real voltage; and
- calculating the magnetic flux change amount estimation value by correcting the basic magnetic flux change amount estimation value relatively to the detection threshold value on the basis of characteristic change of the alternating current motor in a demagnetization state of the permanent magnets of the alternating current motor.

5. The control method of performing a power supply control of an alternating current motor comprising permanent magnets according to claim 4, wherein
a correction value, which corresponds to the characteristic change of the alternating current motor in the demagnetization state of the permanent magnets of the alternating current motor is calculated, and the basic magnetic flux change amount estimation value is corrected on the basis of the correction value, and the corrected basic magnetic flux change amount estimation value is transmitted, as the magnetic flux change amount estimation value, to the demagnetization detection part, and wherein
a first correction map value is generated as the correction value, with which the basic magnetic flux change amount estimation value is corrected so that the d axis real voltage becomes equal to the d axis standard voltage on the basis of one of an output torque, a current and an electrical anglular speed of the alternating current motor based on characteristics of the alternating current motor in the standard state in which no demagnetization occurs in the permanent magnets of the alternating current motor, a second correction map value is generated as the correction value, with which the basic magnetic flux change amount estimation value is corrected so that the d axis real voltage becomes equal to the d axis standard voltage on the basis of one of the output torque, the current and the electrical angular speed of the alternating current motor based on characteristics of the alternating current motor in a transition state when the alternating current motor transits from the standard state to an irreversible demagnetization state, a map switching threshold value is compared with the basic magnetic flux change amount estimation value, where the map switching threshold value is a negative value which is more than the detection threshold value, and the first correction map value is selected when the basic magnetic flux change amount estimation value $\Delta\Phi\_b$ is more than the map switching threshold value, and the second correction map value is selected when the basic magnetic flux change amount estimation value $\Delta\Phi\_b$ is not more than the map switching threshold value, and the basic magnetic flux change amount estimation value $\Delta\Phi\_b$ is corrected by using selected correction map value, and the corrected basic magnetic flux change amount estimation value is used as the magnetic flux change amount estimation value.

6. The control method of performing a power supply control of an alternating current motor comprising permanent magnets according to claim 4, wherein
the detection threshold value is adjusted on the basis of the one of the output torque, the current and the electrical angular speed of the alternating current motor.

* * * * *